United States Patent Office 3,660,354
Patented May 2, 1972

---

3,660,354
QUATERNARY AMMONIUM AND PHOSPHONIUM THIOCYANATES AND THEIR USE AS ACCELERATORS FOR EPOXY RESINS
Heinz Uelzmann, Cuyahoga Falls, Ohio, assignor to The General Tire & Rubber Company
No Drawing. Filed Aug. 13, 1969, Ser. No. 849,924
Int. Cl. C08g 30/12
U.S. Cl. 260—47 EC    13 Claims

---

ABSTRACT OF THE DISCLOSURE

Quaternary ammonium and phosphonium thiocyanates have been found to accelerate the curing of epoxy-amine or epoxy-anhydride systems effectively. Since these compounds are free of protons, they are especially useful for epoxy-anhydride adhesives. These accelerators can also be used in conjunction with known accelerators, such as tertiary amines.

---

BACKGROUND OF THE INVENTION

Epoxy resinous compositions are widely used commercially for a wide variety of applications. Use of such compositions as adhesives or cements is extensive. When the compositions are formulated to provide rigid or semi-rigid cured products, they find wide application in the formation of reinforced plastics and in the manufacture of shaped laminates, e.g., automobile hoods, fenders, boat decks, trays, building panels, furniture parts, adhesives, encapsulating compositions and the like. While the present application is contemplated for use in connection with epoxy resinous compositions of any known type, it has special utility in making rigid and semi-rigid products of high impact resistance.

Utilization of epoxy resinous compositions involves reaction with cross-linking agents to produce curing of the epoxy resinous composition from a liquid or semi-solid condition into a final permanent and solid structure. Numerous materials have been proposed and tested for this purpose and a variety of agents are commercially used in the curing of epoxy resins. One major class of curing agent are the primary and secondary amines (see "Epoxy Resins" by Lee and Neville, McGraw-Hill Book Company, Inc., New York, (1957)). The curing of epoxy resins with primary or secondary amines e.g., diethylene triamine, involves the opening of the 1,2-epoxy ring by reaction with the amine forming an amino alcohol. Another class of curing agent includes the carboxylic acid anhydrides. Although these curing agents provide cured resins of desirable toughness and resistance to mechanical and thermal shock, they are defective in terms of commercial utilization in requiring undesirably long times or elevated temperatures for the completion of the curing. Accordingly, it would be advantageous to have available materials and methods by which the desirable features of using primary and secondary amines or anhydrides as curing agents for epoxy resinous compositions could be improved by acceleration of the curing rate for these agents without adversely affecting other desirable properties or features of the cured epoxy resins.

The curing of epoxy resins can be accelerated with a variety of accelerators or catalysts. Tertiary amines, amine salts, quaternary ammonium salts or anhydrides have been disclosed for use with epoxides to be cured with certain cyclic substituted imidazoles, see U.S. Pat. No. 3,438,937. An organometallic compound, an alkyl acid phosphate, a tertiary amine, a quaternary ammonium salt or a phosphine can be used to catalyze the reaction between a dicarboxylic acid and a cycloaliphatic acetal polyepoxide to form a fusible product which can be converted to an infusible product by further reaction with polyfunctional amines, polyamides, acid and acid anhydrides, boron trifluoride etherate and so forth as shown by U.S. Pat. No. 3,438,849. Amines urea-formaldehyde resins, isocyanates, isothiocyanates, anhydrides, polyphenols Friedel-Crafts catalysts are known as catalysts for curing epoxide resins containing a lactone as a flexibilizing agent, see U.S. Pat. No. 3,203,920. Amines and quaternary ammonium compounds are used to catalyze the reaction between cyanuric acid and epichlorohydrin and to which is added subsequently a polyepoxide followed by dehydrohalogenation and purification to provide triglycidyl isocyanurate in admixture with the polyepoxide. This resulting mixture can be cured with polyamines or anhydrides, see U.S. Pat. No. 3,351,673. As in the case of amine and anhydride curing of epoxy resins, curing involves use of agents having a plurality of the functional groups with such polyfunctional curing agent being used in sufficient quantity to produce thorough cross-linking of the epoxy compound. The accelerator is used in small amounts and serves, not so much as a cross-linking agent for the epoxy compound, but to speed up the curing process performed by the polyfunctional curing agents although it may be bound to the resin during curing.

OBJECTS

A principal object of the present invention is the acceleration of the curing of epoxy resinous compositions with primary or secondary amines or anhydrides. Further objects include the provision of:

(1) New catalyzed epoxy resin compositions comprising primary or secondary amines or anhydrides as curing agents but with accelerated curing rates, permitting the compositions to rapidly cure at relatively low temperatures.

(2) New methods for accelerating the curing of epoxy resins with primary and secondary amines or anhydrides.

(3) Information concerning a new class of accelerators or catalysts to be used in operations for curing epoxy resins with amines.

(4) New catalyzed epoxy resinous compositions of a rigid or semi-rigid type capable of providing hard and impact resistant structures especially useful in forming reinforced plastic articles and in making shaped laminates.

Other objects and further scope of applicability of the present invention will become more apparent from the following detailed description and examples.

SUMMARY OF THE INVENTION

The foregoing objects are accomplished in part by forming epoxy resinous compositions to contain as a curing agent either a primary or secondary amine or mixture thereof or an anhydride and, as an accelerator for the curing of the resinous composition by such curing agent, in a minor amount sufficient to accelerate the curing of the epoxide, a quaternary ammonium and/or phosphonium thiocyanate compound. The primary or secondary amine may contain two or more amino groups. Likewise, the anhydride can have more than one anhydride ring. The active epoxy component of the resinous compositions may be any epoxy compound known to be useful for this purpose but, advantageously, linear polymeric glycidyl polyethers having, on the average, more than one 1,2-epoxy groups per molecule are used as the active epoxy component.

The quaternary ammonium and phosphonium thiocyanates of the present invention have the general formula $(X)(SCN)_n$ where X is selected from the group consisting of $R_4Q$ and $R_3Q(R'QR_2)_mR$, Q is selected from the group consisting of nitrogen and phosphorus, R is selected from the group consisting of acyclic, alicyclic and cyclic hydrocarbon radicals having not over 18 carbon atoms and one free valence bond, R' is the same as R but has two free valence bonds, $m$ is a number from 1 to 10, and $n$ is a number equal to the valence charge of X. For instance, where R is ethyl and R' is ethylene, the following compounds are obtained:

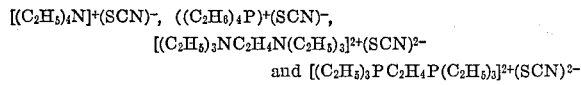

[(C₂H₅)₄N]⁺(SCN)⁻, ((C₂H₅)₄P)⁺(SCN)⁻,
[(C₂H₅)₃NC₂H₄N(C₂H₅)₃]²⁺(SCN)²⁻
and [(C₂H₅)₃PC₂H₄P(C₂H₅)₃]²⁺(SCN)²⁻

In the above formula R can be a methyl, ethyl, propyl, isopropyl, butyl, isobutyl, neopentyl, amyl, hexyl, 5-methylhexyl, isohexyl, heptyl, octyl, isooctyl, nonyl, decyl, dodecyl, or octadecyl radical; a vinyl, allyl, 1-butenyl, or 9-octadecenyl radical; a cyclopropyl, cyclobutyl, cyclopentyl, 2-cyclopenten-1-yl, cyclohexyl, 2,4-cyclopentadien-1-yl, cycloheptyl or cyclooctyl radical; a phenyl, tolyl, cumenyl, naphthyl, benzyl, cinnamyl, phenethyl, styryl or diphenethyl radical; or a phenyl cyclohexyl, cyclobenzyl, methyl cyclohexyl, cyclohexyl phenyl, cyclopentyl butyl radical and similar acyclic, alicyclic and cyclic radicals and the like and mixtures thereof.

R' is the same as R except that the radical has two free valence bonds such as methylene, ethylene, propylene, tetramethylene, ethyl ethylene, pentamethylene, hexamethylene, vinylene, propenylene, 4 - propyl-2-pentenylene, cyclopentylidene, 1,3-cyclopentylene, 3-cyclohexen-1,2-ylene, phenylene, propylene, tolylene, xylylene, diphenylene, and similar acyclic, alicyclic, and cyclic radicals and the like and mixtures of the same. The R's and R's can be the same or different.

Examples of some of these quaternary ammonium or phosphonium thiocyanates are (including mixtures thereof):

Benzyltrimethylammonium thiocyanate
Phenyl tripropylammonium thiocyanate
Cyclohexyl triamylammonium thiocyanate
Phenyldimethylbutylammonium thiocyanate
Tetramethylammonium thiocyanate
Tetracyclobutylammonium thiocyanate
1,2-ethylene-bis-dimethyl-n-butylammonium dithiocyanate
Tetra-n-butylammonium thiocyanate
Octadecyl-tri-n-butyl ammonium thiocyanate
Methyl-tri-cyclohexylammonium thiocyanate
Tetraethyl ammonium thiocyanate
Tritolyl-1-butenyl ammonium thiocyanate
Didecyl dibenzyl ammonium thiocyanate
Triallyl-n-butyl ammonium thiocyanate
1,2-propylene-bis-di-n-butylhexyl ammonium dithiocyanate
Tetrahexyl phosphonium thiocyanate
Benzyl-tri-n-butylphosphonium thiocyanate
Dimethyl-dicyclohexyl phosphonium thiocyanate
Tetra-n-butyl phosphonium thiocyanate With these or other useable polyfunctional amino or organic acid anhydride compounds as curing agents, the catalyzed epoxy resinous compositions of the invention advantageously contain from about 0.01 to 18 parts by weight of the thiocyanate compound for each 100 parts by weight of active epoxy component of the resinous composition. Within the given range relatively large amounts of the thiocyanate are used in making thin sections, films or laminates. Small amounts of the thiocyanate are used where thick sections are to be cast, molded and so forth such as in encapsulation due to the large amount of heat generated from the exothermic reaction or where the composition or laminate is to be heated.

The novel quaternary ammonium and phosphonium thiocyanates of the present invention can be made by several methods. For example, a quaternary ammonium alkoxide can be reacted in a suitable solvent with an alkaline thiocyanate with removal of the alkoxide or alcohol formed. A tertiary amine can be reacted with an organic halide to form an amine salt which is then converted to the quaternary ammonium alkoxide by reaction with an ammonium or alkaline alkoxide and further reacted with alkaline thiocyanate. The phosphonium compound can be made by reacting a quaternary phosphonium hydroxide with an ammonium thiocyanate and separating the reaction product by removing ammonia and water in vacuum. Other methods can be used to make the thiocyanates. Compatible solvents are preferably used to control temperature and improve mixing. The reactants can be heated to speed the reaction. Also, the reactions can be conducted under an inert or nonreactive atmosphere if desired.

DESCRIPTION OF THE PREFERRED EMBODIMENTS

The following examples will serve to illustrate the present invention with more particularity to those skilled in the art.

EXAMPLE 1

Benzyl tri-n-butylphosphonium thiocyanate 300 ml. of methyl Cellosolve, 101.16 g. of tri-n-butylphosphine and 63.3 g. of benzylchloride were mixed and agitated in a reactor while the temperature, without heating, slowly rose to 72° C. The mixture was then refluxed for 5 hours with the pot temperature at 128/129° C. After cooling to 60° C., a 25% methanolic solution of sodium methoxide, 110 g., was added to the reactor in portions and the mixture stirred one hour at 80–85° C. Sodium chloride precipitated from the solution. After cooling to 50° C., ammonium thiocyanate, 40 g., was added to the reactor in increments. The contents were then heated at a pot temperature of 85° C. for 3 hours while ammonia was allowed to escape. After cooling to room temperature and standing overnight, the precipitated NaCl was filtered off and washed with methanol. The combined filtrates were distilled in vacuum up to a pot temperature of 90° C. under 1 mm. of Hg pressure and held for 2 hours in this vacuum at 80 to 90° C. to remove all solvents. The remainder was a viscous oil. Yield 168 g. It crystallized after standing for several days. After recrystallization from water, the product melted at 75–76° C.

Analysis:
Percent N: Found 4.15, 4.07. Calc. 4.25.
Percent S: Found 8.80, 8.82. Calc. 9.73.

EXAMPLE 2

Benzyltrimethylammonium thiocyanate

To 166.8 g. of a 40% methanolic solution of benzyltrimethylammonium methoxide in a reaction vessel were added 29 g. of ammonium thiocyanate with stirring. The solution was heated to 60° C. while ammonia evolved. After 90 minutes at this temperature, the solution was allowed to cool and the methanol removed by vacuum (1 mm. Hg) up to 30° C. pot temperature. The crude solid left in the flask weighed 80 g. After recrystallization from isopropanol, it had a melting point of 121–122° C.

Analysis:
Percent N: Found 13.45, 13.44. Calc. 13.45.
Percent S: Found 15.48, 15.40. Calc. 15.38.

EXAMPLE 3

1,2-ethylene-bis-dimethyl-n-butylammonium thiocyanate 116 g. of N,N,N',N'-tetramethylethylenediamine, 300 g. of methyl Cellosolve, and 274 g. of n-butylbromide were refluxed in a reactor for 48 hours. Pot temperature was 126° C. The contents were allowed to cool and the solvent was removed in vacuum up to 75° C. pot temperature and 0.3 mm. pressure (Hg). The residual product solidified and was dissolved in 300 cc. methanol. Then 435 g. of a 25% solution of sodium methoxide in methanol were added to the reactor and the temperature rose to 30° C. Ammonium thiocyanate, 156 g., was added to the reactor and the reaction mixture refluxed for 48 hours. The methanol was removed in vacuum up to a pot temperature of 70° C. and 0.2 mm. pressure (Hg). The solid residue was heated to reflux in 1 liter of isopropanol, filtered hot from sodium bromide and allowed to cool. The crystalline precipitate was filtered off, washed with isopropanol and dried. Yield: 175 g. M.P. 117–119° C.

Analysis:
  Percent N: Found 15.07, 14.91. Calc. 16.20.
  Percent S: Found 17.46, 17.46. Calc. 18.50.

Formula:

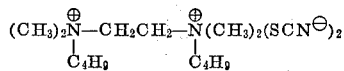

EXAMPLE 4

Triallyl-n-butylammonium thiocyanate 137 g. of triallylamine and 137 g. of n-butylbromide were refluxed in 300 cc. methyl Cellosolve in a reactor for 13 hours. After cooling to 50°, vacuum was applied and the solvent removed up to a pot temperature of 55° C. The residual product was a brownish viscous liquid and weighed 260 g. It was dissolved in 250 cc. of pure methanol and then 217 g. of a 25% solution of sodium methoxide in methanol was added to the reactor and the mixture stirred for 20 minutes. Ammonium thiocyanate, 77 g., was charged into the mixture and heated at reflux temperature until ammonia evolution ceased. After cooling to room temperature, the contents were filtered to remove sodium bromide. The filtrate was freed from solvent in high vacuum up to a pot temperature of 40° C. The viscous reaction product was filtered and weighed 180 g.

Analysis:
  Percent N: Found 11.61, 11.90. Calc. 11.11.
  Percent S: Found 14.16, 14.18. Calc. 12.30.

EXAMPLE 5

Tetraethylammonium thiocyanate 100 g. of a 25% aqueous solution of tetraethylammonium hydroxide were mixed with 13 g. of ammonium thiocyanate in a reactor and heated at 55° C. in a water bath for 1 hour. The water was then removed from the reaction mixture in high vacuum up to 100° C. water bath temperature. The residual product was crystalline and weighed 31 g. It did not melt up to 255–260° C. where it started to decompose.

Analysis:
  Percent N: Found 14.56, 14.57. Calc. 14.89.
  Percent S: Found 16.59, 16.56. Calc. 17.00.

EXAMPLE 6

Tetra-n-butylammonium thiocyanate 88 ml. of a 1 molar solution of tetra-n-butylammonium hydroxide in water were mixed with 6.7 g. of ammonium thiocyanate in a reactor. Ammonia evolved and the mixture was heated at 50–55° C. for 1 hour. A yellow oil separated out. The aqueous lower layer was separated and the upper oily layer washed with a small of water. The oily product was then heated under high vacuum in a hot water bath (90° C.) to remove all water. The remaining product crystallized and had a melting point of 125–126° C. It was partly soluble in water. Yield: 13 g.

Analysis:
  Percent N: Found 9.39, 8.29. Calc. 9.32.
  Percent S: Found 10.24, 10.22. Calc. 10.65.

EXAMPLE 7

Tetra-n-butylphosphonium thiocyanate

To 137 g. of a 40% aqueous solution of tetra-n-butylphosphonium hydroxide in a reactor were added 17 g. of ammonium thiocyanate with stirring. There was a slight exotherm. Then a liquid product separated out and ammonia evolved. The reaction mixture was heated to 50° C. in a water bath for 1 hour. The upper layer was separated, washed with water and heated in high vacuum to 40–45° C. to remove water. The product crystallized after cooling and weighed 77.5 g. It was soluble in benzene, alcohols, acetone. The wax-like product softened at 50° C. and slowly liquefied.

Analysis:
  Percent N: Found 4.62, 4.57. Calc. 4.42.

EXAMPLE 8

Tetramethylammonium thiocyanate 380 g. of a 24% solution of tetramethylammonium hydroxide in methanol in a reactor were diluted with an additional 100 cc. of methanol and 76 g. of ammonium thiocyanate added in increments. Ammonia evolved and the temperature went to 30° C. A white precipitate appeared and the contents were heated in a water bath for 1 hour. After cooling, the precipitate was filtered and part of its recrystallized from methanol. It started to decompose around 260° C. but did not melt up to 300° C. More product was recovered from the methanol solution after removal of the solvent in vacuum. The yield was almost quantitative. The compound was soluble in water, difficultly soluble in hot or cold isopropanol but readily soluble in methanol at 60° C.

EXAMPLE 9

16 g. of methyl nadic anhydride were heated in a polyethylene beaker to 100° C. then 1 g. of tetramethylammonium thiocyanate was added and kept at 100° C. for 30 minutes. After cooling back to room temperature, 20 g. of Epon 828 (a liquid polyepoxide (an epichlorohydrin-Bisphenol A condensation product) having a color at 25° C. (Gardner) of 12 (max.), an epoxide equivalent of 175–210, an average molecular weight of 350–400 and a viscosity in centipoises at 25° C. of about 5,000–16,000) were mixed into it and the mixture placed into an oven at 100° C. Gel time was 27–29 minutes. Shore D hardness: 97.

EXAMPLE 10

A mixture of 16 g. methyl nadic anhydride and 1 g. of tetra-n-butylammonium thiocyanate were preheated for 5 minutes at 100° C. in a polyethylene beaker then 20 g. of Epon 828 (see Ex. 9) added after cooling and the mixture cured at 100° C. Gel time was 28–30 minutes. Shore D hardness: 97.

EXAMPLE 11

20 g. of Epon 828 (see Ex. 9) and 16 g. of methyl nadic anhydride were mixed and heated to 100° C. in a polyethylene beaker. To the hot mixture was added 1 g. of tetra-methylammonium thiocyanate and cured at 100° C. Gel time was 18–20 minutes. Shore D hardness: 97. When 1 g. of tetra-ethylammonium thiocyanate was used as an accelerator under the same conditions, the gel time was 16 to 18 minutes. Shore D hardness: 97. 1 g. of tetrabutylammonium thiocyanate under similar conditions gave a gel time of 21 to 23 minutes and a Shore D hardness of 97.

EXAMPLES 12 TO 53

For the examples listed in the following table, the accelerators were usually added to the mixture of the epoxy resin and the anhydride at room temperature and thoroughly mixed. Some of the accelerators were mixed into the preheated epoxy or anhydride component in order to effect quicker dissolution. The solid accelerators were finely ground before addition. In the case of the epoxy-amine resin system, the accelerator was first mixed into the epoxy resin and the amine curing agent added afterwards. Polyethylene beakers were used for these examples.

TABLE

| Ex. | Epon 828 (see Ex. 9) | Anhydride | Accelerator | Gel time |
|---|---|---|---|---|
| 12 | 20 grams | 16 grams MNA | None | At 120° C.—16 hrs. |
| 13 | do | do | No quaternary thiocyanate, 0.1 gram BDMA | At 100° C.—130 min. |
| 14 | do | do | 1 gram BTAT | At 100° C.—30/32 min. |
| 15 | do | do | 0.5 gram BTAT | At 100° C.—50/55 min. |
| 16 | do | do | 0.5 gram BTAT, 0.1 gram BDMA | At 100° C.—41 min. |
| 17 | do | do | 1 gram TMAT | At 100° C.—30/32 min. |
| 18 | do | do | 0.5 gram TMAT | At 100° C.—45/47 min. |
| 19 | do | do | 0.24 gram TMAT | At 100° C.—65/68 min. |
| 20 | do | do | 0.1 gram TMAT | At 100° C.—80/85 min. |
| 21 | do | do | 1 gram TBAT | At 100° C.—39/40 min. |
| 22 | do | do | 0.5 gram TBAT | At 100° C.—48/50 min. |
| 23 | do | do | 0.25 gram TBAT | At 100° C.—80 min. |
| 24 | do | do | 0.1 gram TBAT | At 100° C.—130 min. |
| 25 | do | do | 0.1 gram TBAT, 0.1 gram BDMA | At 100° C.—58 min. |
| 26 | do | do | 1 gram TEAT | At 100° C.—39/40 min. |
| 27 | do | do | 0.5 gram TEAT | At 100° C.—40 min. |
| 28 | do | do | 0.25 gram TEAT | At 100° C.—75 min. |
| 29 | do | do | 0.1 gram TEAT | At 100° C.—140 min. |
| 30 | do | do | 0.1 gram TEAT, 0.1 gram BDMA | At 100° C.—95 min. |
| 31 | do | do | 1 gram TABT | At 100° C.—40 min. |
| 32 | do | do | 0.5 gram TABT | At 100° C.—58/60 min. |
| 33 | do | do | 0.1 gram TABT | At 100° C.—110/120 min. |
| 34 | do | do | 0.1 gram TABT, 0.1 gram BDMA | At 100° C.—85/90 min. |
| 35 | do | do | 1 gram EDAT | At 100° C.—38/42 min. |
| 36 | do | do | None | Not cured after 6 weeks at 56° C. |
| 37 | do | do | 2 grams BTPT | At 56° C.—3.3 hrs. |
| 38 | do | do | 1 gram BTPT | At 56° C.—6-7 hrs. |
| 39 | do | do | 1 gram TBPT | At 56° C.—5.5 hrs. |
| 40 | do | do | do | At 100° C.—27/29 min. |
| 41 | do | do | 1 gram TMAT (only partly dissolved) | At 50° C.—5 hrs. |
| 42 | do | do | 1 gram TEAT | At 56° C.—2.2 hrs. |
| 43 | do | do | 1 gram EDAT | At 56° C.—6-7 hrs. |
| 44 | do | 5.8 grams DGA | 0.1 gram BTAT | At 100° C.—54/57 min. |
| 45 | do | do | 0.05 gram BTAT | At 100° C.—120/125 min. |
| 46 | do | do | 0.25 gram BTAT | At 100° C.—40/41 min. |
| 47 | do | do | 0.5 gram BTAT | At 100° C.—27/28 min. |
| 48 | do | do | 0.75 gram BTAT | At 100° C.—24 min. |
| 49 | do | do | 1.0 gram BTAT | At 100° C.—12 min. |
|  |  | Amine |  |  |
| 50 | 18 grams | 1.6 grams DETA | None | At 25° C.—70 min. |
| 51 | do | do | 2 grams BTAT | At 25° C.—25 min. |
| 52 | do | do | 2 grams TMAT | At 25° C.—35-40 min. |
| 53 | do | do | 2 grams BTPT | At 25° C.—17-18 min. |

NOTE: MNA=Methyl nadic anhydride; DGA=Diglycolic acid anhydride; BDMA=Benzyldimethylamine; BTAT=Benzyltrimethylammonium thiocyanate; TMAT=Tetramethylammonium thiocyanate; EDAT=1,2-Ethylene-bis-dimethyl-n-butylammonium thiocyanate; TBAT=Tetra-n-butylammonium thiocyanate; TEAT=Tetraethylammonium thiocyanate; TABT=Triallyl-n-butylammonium thiocyanate; BTPT=Benzyl-tri-n-butylphosphonium thiocyanate; TBPT=Tetra-n-butylphosphonium thiocyanate; DETA=Diethylene triamine.

DISCUSSION OF DETAILS

The success of the present invention is due to the discovery that certain thiocyanates while ineffective themselves as curing agents for epoxy resins, will greatly accelerate the curing of epoxy resins by amines and anhydrides. It has been further found that by varying concentration or chemical structure of the thiocyanate compounds, the rate of acceleration can be modified and controlled.

Any primary or secondary polyamino compound known to be useful in the curing of epoxy resins is contemplated for use as the curing agent for the new catalyzed epoxy resinous compositions. Numerous examples of such compounds can be found in the technical literature and patents concerned with epoxy resins (see "Epoxy Resins" by Skeist, Reinhold Publishing Corp., New York, 1958 and "Epoxy Resin Technology," Bruins, Interscience Publishers, New York, 1968). Examples of Polyamino compounds which may advantageously be used in forming the new catalyzed resinous compositions include: diethylene triamine, diethyl amino propylamine, tetraethylene pentamine, triethylene tetramine, N-(2-hydroxy propyl)ethylene diamine, polyethylene imine, 1,6-hexamethylene diamine, bis-hexamethylene triamine, 1,3-diamino-2-propanol, N-(hydroxy propyl)m-phenylene diamine, tris-4-piperidyl cyclohexane, bis-(cyanoethyl diethylene triamine, phenylene diamine, 4,4'-methylene dianiline, polyoxypropylene diamines (M.W. 300–3500), N-stearyl hexamethylene diamine, amine containing polyamide condensation resins (Versamids), benzidine, 3-ethoxy benzidine, and 2,4,6-tris aminomethyl phenol and the like and mixtures of the same.

The amine curing agents are used in amounts known to the art necessary to get the desired cross-linking and/or curing of the epoxide resin. Generally, they are used in about stoichiometric ratio with the liquid epoxide resin usually in amounts of less than 15 parts by weight per 100 parts by weight of the epoxide, preferably from about 4 to 12 parts by weight of the amine curing agent per 100 parts by weight of the epoxide resin.

Likewise, any organic carboxylic acid anhydride known to the art to be useful in the curing of epoxide resinous materials can be employed in the practice of the present invention. Examples of such anhydrides include diglycolic acid, maleic, chloromaleic, methyl maleic, succinic, methyl succinic, dodecenyl succinic, octyl succinic, methylene succinic (itaconic), nadic, methyl nadic (methyl endomethylene tetrahydrophthalic anhydride), chlorendic, tricarballylic, trimellitic, pyromellitic dianhydride, phthalic, tetrahydrophthalic, tetra bromophthalic, tetra chlorophthalic, hexahydrophthalic, and dichloromaleic and the like and mixtures thereof.

The anhydrides are used in amounts known to the art to get the desired degree of curing and/or crosslinking of the epoxide resins. Generally, from about 0.4 to 1.8 mols of anhydride carboxyl per epoxy equivalent, preferably about 0.85 to 1.1 mols of anhydride carboxyl per epoxy equivalent of the epoxide resin are used.

Tertiary amines are well known as catalysts for epoxide curing, particularly with respect to the curing of epoxides with anhydrides. These tertiary amines can be used in amounts of from about 0.02 to 5 parts by weight per 100 parts by weight of the epoxide when employing them in anhydride cures in conjunction with the thiocyanate catalysts discussed herein.

Examples of suitable tertiary amine catalysts or accelerators to be used in the practice of the present invention are triethylamine, benzyldimethylamine, tributyl amine, xylyl diethyl amine, dioctyl ethyl amine, alpha-methyl-benzyl dimethyl amine, dimethyl aminomethyl phenol, tridimethylamino methyl phenol and the like and mixtures thereof. It will be noted as shown in Examples 12, 13, 16, 24, 25, 29, 30, 33 and 34 of the above table the use of the thiocyanate compound and the tertiary amine together or as a mixture provides a synergistic result. Preferably, the mol ratio of the quaternary ammonium compound to the tertiary amine catalyst when such mixtures are used can vary from about 5:1 to 1:5.

The new quaternary ammonium or phosphonium thiocyanate acceleration of amino curing of epoxy resins may be applied to any type of resinous composition containing an active epoxy component capable of being cured to a solid state. Linear polymeric glycidyl polyethers having on the average, more than one 1,2-epoxy groups per molecule are preferred. A variety of such epoxy products are commercially available, e.g., "Epon 828." Many additional polyepoxy compounds capable of forming gels and being cured to solid products can be prepared by reaction of epichlorohydrin with bis-phenols, e.g., see U.S. Pat. No. 2,506,486. Further examples of epoxy compounds which may be used in forming epoxy resinous compositions are disclosed in U.S. 2,871,217 as well as in the other literature and patent references discussed herein. These, and related equivalent materials known to be useful in this art, may be employed in carrying out the new methods and forming the new products of this invention.

The time required for completion of the curing of resinous compositions of the invention depends usually in inverse proportion to the concentration of curing agent and accelerator within the preferred concentrations as hereinbefore defined. Similarly, time of cure is generally inversely proportional, though not necessarily linearly, upon the temperature of the composition during the curing process. As curing occurs, the mass of resinous composition may acquire an elevated temperature, e.g., 50° C. or higher, e.g., 50–120° C., through the exothermic reaction of the resin curing.

The catalyzed resinous compositions of the invention may be formed using any of the mixing techniques and apparatus known to be useful in the epoxy resin art. Advantageously, the active epoxy component of the composition can be mixed with the thiocyanate and then when conditions are ready for prompt casting, spreading or other utilization of the resinous composition, the amine or anhydride curing agent is added and the mixture is homogenized.

Resinous compositions of the invention may contain only the three essential ingredients, but it may be advantageous to incorporate other added materials, e.g., fillers dyes, pigments, plasticizers, extenders, inhibitors, fire-resistant materials and the like. Examples of materials which fall in these categories and which may be usefully included comprise: zinc oxide, carbon black, iron oxides, barytes, chalk, chrome green, cadmium reds, titanium dioxide, silicon dioxide, mica, asbestos, talc, glass fibers, glass microspheres, cellulosic fibers, synthetic fibers, alumina, antimony oxide, phthalocyanine blue or green, zinc borate, cadmium blue, synthetic rubbers, polyester resins, polyurethane resins and the like. Such added materials may comprise 0.01 to 50% of the total resinous composition and advantageously between about 0.1 and 10%.

Catalyzed epoxy resinous compositions of the invention may be employed for any application for which rigid or semi-rigid epoxy type compositions are known to be useful. Hard and impact resistant products can advantageously be formed from these composition, especially such products which are reinforced with glass fibers and other fillers as indicated above or in making laminations from glass fiber fabrics, polyester textiles or similar reinforcement webs in the formation of molded or shaped articles such as automobile body parts, boat hulls, decks or other structures, trays, and similar utensils, parts of furniture or the like. Other uses include formation of building panels and sheets, floor and wall coverings, bonded abrasive wheels, and the bonding metal-to-metal, glass-to-glass, glass-to-metal, wood-to-wood and the like.

The embodiments of the invention in which an exclusive property or privilege is claimed are defined as follows:

1. A catalyzed curable composition comprising:
   (I) an epoxide resin containing on the average more than one 1,2-epoxy group per molecule,
   (II) an organic polycarboxylic acid anhydride epoxide curing agent in an amount sufficient to cure said epoxide resin,
   (III) and, in an amount sufficient to accelerate the curing of said epoxide resin, a catalyst selected from the group consisting of quaternary ammonium thiocyanates and quaternary phosphonium thiocyanates having the general formula $(X)(SCN)_n$
      where X is selected from the group consisting of $R_4Q$ and $R_3Q(R'QR_2)_mR$,
      where Q is selected from the group consisting of nitrogen and phosphorus, R is selected from the group consisting of acyclic, and cyclic hydrocarbon radicals having not over 18 carbon atoms and having one free valence bond, R' is the same as R but has two free valence bonds, $m$ is a number from 1 to 10, and $n$ is a number equal to the valence charge of X.

2. A catalyzed curable composition according to claim 1 wherein:
   said organic polycarboxylic acid anhydride curing agent is used in an amount of from about 0.4 to 1.8 mols of anhydride carboxyl per epoxy equivalent, and said catalyst is used in an amount of from about 0.01 to 18 parts by weight per 100 parts by weight of said epoxide resin.

3. A composition according to claim 2 where X is $R_4Q$, Q is nitrogen, R is selected from the group consisting of methyl, ethyl and n-butyl and $n$ is 1.

4. A composition according to claim 2 where X is $R_4Q$, Q is nitrogen, R consists of one benzyl and three methyl radicals, and $n$ is 1.

5. A composition according to claim 2 where X is $R_4Q$, Q is nitrogen, R consists of one n-butyl and three allyl radicals and $n$ is 1.

6. A composition according to claim 2 where X is $R_3Q(R'QR_2)_mR$, Q is nitrogen, R consists of one n-butyl and two methyl radicals, R' is ethylene, $m$ is 1 and $n$ is 2.

7. A composition according to claim 2 where X is $R_4Q$, Q is phosphorus, R is n-butyl and $n$ is 1.

8. A composition according to claim 2 where X is $R_4Q$, Q is phosphorus, R consists of one benzyl and three n-butyl radicals and $n$ is 1.

9. A composition according to claim 2 containing additionally a tertiary amine epoxide curing catalyst.

10. A composition according to claim 9 in which the mol ratio of said thiocyanate catalyst to said tertiary amine catalyst is from about 5:1 to 1:5.

11. In the method of curing a composition comprising an epoxy resin with an organic polycarboxylic acid anhydride curing agent for said epoxy resin, said epoxy resin containing on the average more than one 1,2-epoxy group per molecule and said curing agent being used in an amount sufficient to cure said epoxy resin, the improvement which consists of accelerating the curing reaction by including in the composition a catalytic amount, sufficient to accelerate the cure of said epoxy resin, of a compound selected from the group consisting of quaternary ammonium thiocyanates and quaternary phosphonium thiocyanates having the general formula $(X)(SCN)_n$,
   where X is selected from the group consisting of $R_4Q$ and $R_3Q(R'QR_2)_mR$, where Q is selected from the group consisting of nitrogen and phosphorus, R is selected from the group consisting of acyclic, and cyclic hydrocarbon radicals having not over 18 carbon atoms and having one free valence bond, R' is the same as R but has two free valence bonds, $m$ is a number from 1 to 10, and $n$ is a number equal to the valence charge of X.

12. The method according to claim 11 in which the composition additionally contains a catalytic amount of a tertiary amine epoxide catalyst.

13. The method according to claim 12 in which the mol ratio of said thiocyanate compound to said tertiary amine is from about 5:1 to 1:5.

References Cited

UNITED STATES PATENTS

| | | | |
|---|---|---|---|
| 2,928,794 | 3/1960 | Belanger et al. | 260—2 EP |
| 2,949,441 | 8/1960 | Newey | 260—47 X |
| 3,377,406 | 4/1968 | Newey et al. | 260—18 X |

WILLIAM H. SHORT, Primary Examiner

T. E. PERTILLA, Assistant Examiner

U.S. Cl. X.R.

106—163; 117—124 E, 128.4, 148, 161 ZB; 161—185; 252—426, 437, 438; 260—9 R, 37 Ep, 78.4 Ep, 567.6 R, 606.5 F, 830, 835

UNITED STATES PATENT OFFICE
CERTIFICATE OF CORRECTION

Patent No. 3,660,354            Dated May 2, 1972

Inventor(s) Heinz Uelzmann

It is certified that error appears in the above-identified patent and that said Letters Patent are hereby corrected as shown below:

I. Column 3, line 4:

"$((C_2H_6)_4P)^+(SCN)^-$" should be ---$((C_2H_5)_4P)^+(SCN)^-$---.

II. Columns 7 and 8, Table, under "Gel Time", Example 41:

"50"      should read      ---56---.

III. Column 10, line 22:

"$B_4Q$"      should read      ---$R_4Q$---.

Signed and sealed this 10th day of October 1972.

(SEAL)
Attest:

EDWARD M. FLETCHER, JR.          ROBERT GOTTSCHALK
Attesting Officer                Commissioner of Patents